United States Patent
Lee

(10) Patent No.: US 9,060,504 B2
(45) Date of Patent: Jun. 23, 2015

(54) DEVICE FOR REPELLING ANIMALS USING ACOUSTIC WAVES

(71) Applicant: Seung Noh Lee, Seoul (KR)

(72) Inventor: Seung Noh Lee, Seoul (KR)

( * ) Notice: Subject to any disclaimer, the term of this patent is extended or adjusted under 35 U.S.C. 154(b) by 0 days.

(21) Appl. No.: 14/347,247

(22) PCT Filed: Sep. 20, 2012

(86) PCT No.: PCT/KR2012/007508
§ 371 (c)(1),
(2) Date: Mar. 26, 2014

(87) PCT Pub. No.: WO2013/048057
PCT Pub. Date: Apr. 4, 2013

(65) Prior Publication Data
US 2014/0247696 A1     Sep. 4, 2014

(30) Foreign Application Priority Data
Sep. 26, 2011 (KR) .................. 10-2011-0096881

(51) Int. Cl.
*A01M 29/16* (2011.01)
*A01M 29/18* (2011.01)

(52) U.S. Cl.
CPC ............... *A01M 29/16* (2013.01); *A01M 29/18* (2013.01)

(58) Field of Classification Search
CPC ............................. A01M 29/18; A01M 29/16
USPC ................. 367/139; 340/384.2, 384.4, 384.7, 340/384.72
See application file for complete search history.

(56) References Cited

U.S. PATENT DOCUMENTS

| 5,278,537 A * | 1/1994 | Carlo et al. ............... 367/139 |
| 2014/0247696 A1* | 9/2014 | Lee .............................. 367/139 |

FOREIGN PATENT DOCUMENTS

| CN | 2802968 | 8/2006 |
| CN | 201888182 | 7/2011 |
| JP | 2010-246535 | 11/2010 |
| KR | 20-0242836 | 10/2001 |
| KR | 20-0242896 | 10/2001 |
| KR | 10-0414556 | 1/2004 |
| KR | 20-2010-0012970 | 12/2010 |
| WO | WO 2013/048057 | 4/2013 |

OTHER PUBLICATIONS

Translation CN201888182.*

(Continued)

*Primary Examiner* — Daniel Pihulic

(57) ABSTRACT

A device for repelling animals using acoustic waves, comprising an acoustic wave generation unit (11); first and second frequency adjusting units (12, 13) to induce the generation of resonance of the pulse signal generated from the acoustic wave generation unit (11); an acoustic wave output unit (14) to output the acoustic wave; a resonance generation-type acoustic wave output unit (15) to output the acoustic wave; a resonance generation unit (16) which forms a space in which the acoustic wave outputted from the acoustic wave output unit (14) and the acoustic wave outputted from the resonance generation-type acoustic wave output unit (15) stay at the same time, and amplifies the volume and the frequencies by inducing resonance to be generated by mutual interference; and an acoustic wave diffusing unit (17) which diffuses the acoustic waves expanded by the resonance to a free space via an induction pathway.

16 Claims, 2 Drawing Sheets

(56) References Cited

OTHER PUBLICATIONS

Translation CN2802968.*

International Search Report Dated Feb. 28, 2013 From the International Searching Authority Re. Application No. PCT/KR2012/007508 and Its Translation Into English.

* cited by examiner

DEVICE FOR REPELLING ANIMALS USING ACOUSTIC WAVES

CROSS-REFERENCE TO RELATED APPLICATIONS

This application is a National Phase of PCT Patent Application No. PCT/KR2012/07508 having International filing date of Sep. 20, 2012, which claims the benefit of priority of Korean Patent Application No. 10-2011-0096881 filed on Sep. 26, 2011. The contents of above applications are all incorporated reference as if fully set forth here in their entirety.

TECHNICAL FIELD

The present invention relates to an animal repelling device using acoustic waves, and more particularly, to an animal repelling device using acoustic waves by resonating, amplifying, and diffusing an acoustic wave band in which animals hate, so as to prevent damage of crops, to prevent a safety accident at a telegraph pole, to prevent a safety accident upon taking off and landing of various airplanes, and to prevent a safety accident in tracks of high-speed trains by a wild animal, particularly, birds.

BACKGROUND ART

In general, when vibrating air by rubbing objects, a sound is generated, and the vibration number of times for second is a frequency, and in order to represent the frequency, a unit of hertz (Hz) is used. That is, 500 Hz is to vibrate 500 times air for 1 second.

A thick and low sound has a low frequency, and a thin and high sound has a high frequency. A frequency range is from 0 to an infinite quantity, but 15 Hz-20,000 Hz is referred to as a frequency, i.e., an audible frequency in which a human being can detect. A sound of 15 Hz or less is referred to as a low frequency, and a sound of 20,000 Hz or more is referred to as a ultrasonic wave, and an animal or an insect may hear a sound of 20000 Hz or more, and a whistle that calls a dog and an ultrasonic insect repelling device are a device using this principle.

In the whistle that calls a dog, a human being cannot hear a whistle sound and a dog hears the whistle sound and comes running. In the ultrasonic insect repelling device, a human being cannot hear a sound of the ultrasonic insect repelling device and may fall asleep, but a flea or an ant does not approach due to the sound, and a low frequency is generally used for a physical therapy.

As described above, a plurality of devices that repel an animal using acoustic waves in which a human being cannot hear and in which only an animal can hear have been introduced.

For example, there are Korean Registered Utility Model No. 289,410 (wild animal repelling device using ultrasonic wave explosive sound, filed on Jun. 8, 2002, hereinafter, referred to as Document 1) and Korean Patent Registration No. 367,810 (magpie repelling device for preventing a power failure accident, filed on Mar. 2, 2003, hereinafter, referred to as Document 2).

Document 1 relates to a wild animal repelling device that repels a wild animal by generating an ultrasonic wave explosive sound using a pressure of an explosive gas by exploding a gas at a cartridge chamber at a location such as agricultural land, an orchard, and an airfield and that includes a gas tank, an ignition device, a cartridge chamber, a nozzle, a horn, and an electronic circuit and that generates an explosive sound by supplying and exploding a gas to the cartridge chamber and that generates an ultrasonic wave explosive sound in which a wild animal dislikes with an irregular interval and an irregular magnitude by the electronic circuit by generating an ultrasonic wave explosive sound in the horn vertically attached to a cylinder by spraying an explosive gas to a nozzle of the vertically installed cylinder.

Document 2 relates to a magpie repelling device for preventing a power failure accident occurring by birds, particularly, a magpie in an electric pole of a distribution line and preventing a power failure accident that causes auditory wariness of the magpie using a warning sound in vocal characteristics of the magpie and that causes visual dislike by producing a repelling device with a red color in which the magpie hates and that generates a warning sound so as to prevent birds, particularly, a magpie from approaching an electric pole by driving a rotation driving device.

A conventional animal repelling device using acoustic waves generates an ultrasonic wave and transmits the ultrasonic wave to free space and relates to well-known technology having no technical difficulty.

A wavelength of acoustic waves gradually decreases as receding from a sound source and disappears in some moment, and this represents a principle in which when a stone drops to quiet water, a wavelength gradually decreases as receding from a point in which the stone is dropped and finally disappears. A loud sound has a long wavelength, and this is the same as a principle in which a large stone has a long wavelength. For example, there is a large difference in magnitudes of wavelengths in which a stone of 100 Kg and a stone of 1 Kg cause.

By using such a principle, a conventional animal repelling device using acoustic waves amplifies acoustic waves through a separate amplifying circuit in order to enlarge a transmitting radius after generating acoustic waves, but at this case, in an amplifying process, noise or a frequency is deformed (distorted) and thus there is a problem that acoustic waves that deviates from acoustic waves in which an animal dislikes are output.

DETAILED DESCRIPTION OF INVENTION

Technical Problem

The present invention has been made in view of the above problems, and provides an animal repelling device using acoustic waves that resonates, amplifies, and diffuses an acoustic wave band in which animals hate, so as to prevent damage of crops, to prevent a safety accident at a telegraph pole, to prevent a safety accident upon taking off and landing of various airplanes, and to prevent a safety accident in tracks of high-speed trains by a wild animal, particularly, birds.

The present invention further provides an animal repelling device using acoustic waves that extensively diffuses acoustic waves to free space without deformation of noise or a frequency by amplifying acoustic waves through resonance.

Technical Solution

In accordance with an aspect of the present invention, there is an animal repelling device using acoustic waves including: an acoustic wave generating unit 11 that generates an electrical pulse signal; first and second frequency adjusting units 12 and 13 that adjust a frequency so as to induce resonance generation of a pulse signal generated in the acoustic wave generating unit 11; an acoustic wave output unit 14 that converts and outputs a pulse signal that is output via the first frequency adjusting unit 12 to acoustic waves; a resonance generation acoustic wave output unit 15 that converts and outputs a pulse signal that is output via the second frequency adjusting unit 13 to acoustic waves; a resonance generation unit 16 that amplifies a sound volume and a frequency by inducing to generate resonance by mutual interference by providing space in which acoustic waves that are output from the acoustic wave output unit 14 and acoustic waves that are output from the resonance generation acoustic wave output unit 15 simultaneously stay; and an acoustic wave diffusion unit 17 that diffuses acoustic waves expanded due to resonance generation to free space via an induction path.

Advantageous Effects

According to the present invention, by resonating, amplifying, and diffusing an acoustic wave band in which animals hate, damage of crops by a wild animal, particularly, birds can be prevented, a safety accident at a telegraph pole can be prevented, upon taking off and landing of various airplanes, a safety accident can be prevented, and a safety accident in tracks of high-speed trains can be prevented.

Further, according to the present invention, by amplifying acoustic waves through resonance by simultaneously staying acoustic waves that are output from an acoustic wave output unit and acoustic waves that are output from a resonance generation acoustic wave output at space of a resonance generation unit, noise or a frequency is deformed in an amplifying process and thus acoustic waves that deviate from acoustic waves in which an animal hates can be prevented from being output.

DESCRIPTION OF SYMBOLS

Figure 1:
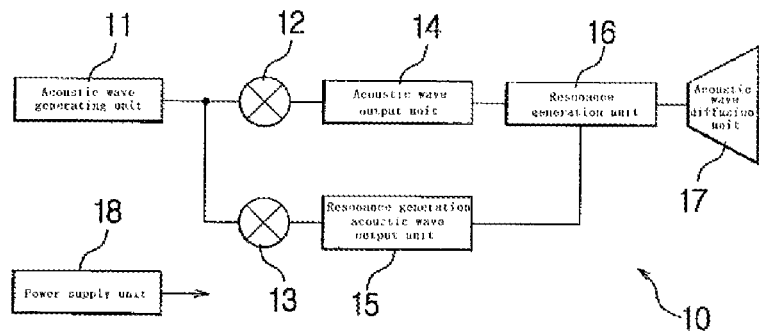
FIG. 1 is a block diagram illustrating a configuration of an animal repelling device according to an exemplary embodiment of the present invention.

10: animal repelling device using acoustic waves 11: acoustic wave generating unit

12, 13: first and second frequency adjusting unit 14: acoustic wave output unit

15: resonance generation acoustic wave output unit 16: resonance generation unit

17: acoustic wave diffusion unit 18: power supply unit

BEST MODES FOR CARRYING OUT THE INVENTION

An animal repelling device 10 using acoustic waves according to an exemplary embodiment of the present invention includes: an acoustic wave generating unit 11 that generates an electrical pulse signal; first and second frequency adjusting units 12 and 13 that adjust a frequency so as to induce resonance generation of a pulse signal generated in the acoustic wave generating unit 11; an acoustic wave output unit 14 that converts and outputs a pulse signal that is output via the first frequency adjusting unit 12 to acoustic waves; a resonance generation acoustic wave output unit 15 that converts and outputs a pulse signal that is output via the second frequency adjusting unit 13 to acoustic waves; a resonance generation unit 16 that amplifies a sound volume and a frequency by inducing to generate resonance by mutual interference by providing space in which acoustic waves that are output from the acoustic wave output unit 14 and acoustic waves that are output from the resonance generation acoustic wave output unit 15 simultaneously stay; and an acoustic wave diffusion unit 17 that diffuses acoustic waves expanded due to resonance generation to free space via an induction path.

Modes for Carrying out the Invention

A configuration of the present invention will be described in detail with reference to the accompanying drawings.

Figure 2:
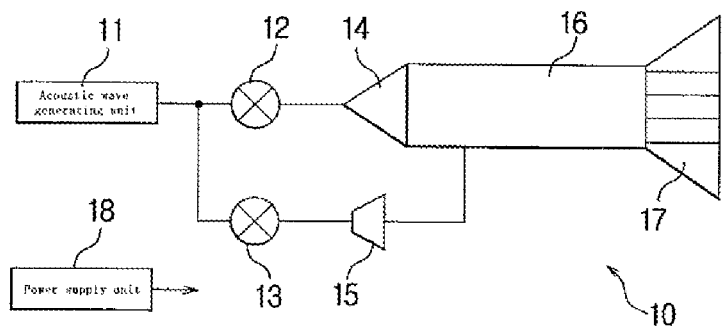
FIG. 2 is a block diagram illustrating a configuration of an animal repelling device according to an exemplary embodiment of the present invention.

As shown in FIGS. 1 and 2, an animal repelling device 10 using acoustic waves according to an exemplary embodiment of the present invention includes: an acoustic wave generating unit 11 that generates an electrical pulse signal; first and second frequency adjusting units 12 and that adjust a frequency so as to induce resonance generation of a pulse signal generated in the acoustic wave generating unit 11; an acoustic wave output unit 14 that converts and outputs a pulse signal that is output via the first frequency adjusting unit 12 to acoustic waves; a resonance generation acoustic wave output unit 15 that converts and outputs a pulse signal that is output via the second frequency adjusting unit 13 to acoustic waves; a resonance generation unit 16 that amplifies a sound volume and a frequency by inducing to generate resonance by mutual interference by providing space in which acoustic waves that are output from the acoustic wave output unit 14 and acoustic waves that are output from the resonance generation acoustic wave output unit 15 simultaneously stay; and an acoustic wave diffusion unit 17 that diffuses acoustic waves expanded due to resonance generation to free space via an induction path.

Here, the acoustic wave generating unit 11 according to an exemplary embodiment of the present invention may be a pulse generating circuit including an oscillator that generates a pulse of acoustic waves.

In this case, the acoustic wave may be a vibration or a pressure wave occurring within an elastic medium and may be a ultrasonic wave having a specific frequency zone of audible frequencies and a frequency of a value larger than 20 KHz, which is an audible frequency, a high frequency of a range 3-30 MHz, or a super ultrasonic wave of 500 MHz or more.

In acoustic waves having the above range, acoustic waves in which each animal hates within the range are previously set and thus acoustic waves may be sequentially and continuously generated.

In the foregoing description, a specific frequency band of an audible frequency may be a frequency band in which for example, birds, particularly, a magpie hates. A sound in which birds, particularly, a magpie generates may be classified into Begging Trill, Begging Scream, Soft Whistles, Distress Call, and Alarm Call, and Begging Trill, Begging Scream, and Soft Whistles generate only for 30 days since a magpie is born and completely disappear after 30 days since the magpie's birth, and Distress Call and Alarm Call have been first discovered at about 17 days after the magpie's birth, but have been continuously observed without change of a tone after about 17 days.

A vocalization change of such birds, particularly, a magpie occurs at a period in which a body temperature regulation ability occurs, and a body temperature regulation ability and a vocalization change of birds, particularly, a magpie represent that the magpie is grown to a ripe bird. When a sudden threat is applied to birds, particularly, a magpie, a baby magpie after 20 days since the magpie's birth shrinks and represents a passive reaction, but a baby magpie after 20 days since the magpie's birth represents an active reaction that jumps down a nest, and in this case, a sound in which a baby magpie makes while jumping down a nest is Alarm Call. Alarm Call has a typical tone of 3, 6, 9 [KHz] and 0.05 [sec] and has a continuously representing vocalization characteristic even after growth ends without a potential period like Distress Call.

When letting birds, particularly, a magpie to hear Distress Call, at experiments of 4 times among experiments of 9 times, a phenomenon that a mother magpie returned to a baby magpie was observed, and in Alarm Call, at experiments of 15 times of experiments of 18 times, a phenomenon that a mother magpie returned to a baby magpie was observed.

Therefore, it is known that Alarm Call causes wariness to birds, particularly, a magpie and causes a stress.

The first frequency adjusting unit 12 according to an exemplary embodiment of the present invention may be an automatic frequency adjustor or a frequency adjustment circuit including an automatic frequency adjustor or automatic frequency adjustor and includes a capacitor bank selection circuit that operates as an open loop and that compares a frequency signal in which a reference frequency is integer divided while operating as an open loop and the reference frequency signal and that selects a capacitor bank corresponding to an output frequency and a capacitor bank adjustment circuit that operates as a closed-loop when the capacitor bank is selected and that compares an output voltage corresponding to the output frequency and a preset voltage range and that adjusts a capacitor bank selected from a capacitor bank selection unit.

As described above, the first frequency adjusting unit 12 is a device that adjusts a frequency so as to induce resonance generation, has a frequency adjustment function, and in order to induce resonance of necessary each frequency band according to a purpose (according to animals), a frequency may be automatically adjusted, but a constant frequency (acoustic wave in which frequently appearing animals hate) may be maintained, i.e., fixed through a manual manipulation.

In the present invention, the second frequency adjusting unit 13 is similar to the first frequency adjusting unit 12 and thus a detailed description thereof will be omitted.

The acoustic wave output unit 14 may be a speaker that outputs acoustic waves having an adjusted frequency that is input in the first frequency adjusting unit 12 to internal space through a one side terminal of the resonance generation unit 16.

The resonance generation acoustic wave output unit 15 may be a speaker that outputs acoustic waves having an adjusted frequency that is input in the second frequency adjusting unit 13 to internal space through a side surface of the resonance generation unit 16 adjacent to the acoustic wave output unit 14 and a pipe that communicates between the speaker and the resonance generation unit 16 or may be a pipe that induces acoustic waves having an adjusted frequency that is input in the second frequency adjusting unit 13 to internal space through a side surface of the resonance generation unit 16 adjacent to the acoustic wave output unit 14.

The resonance generation unit 16 may be a pipe having resonant space.

The acoustic wave diffusion unit 17 is an expansion type acoustic wave output body that induces acoustic waves amplified by resonance and that diffuses the acoustic wave to free space, and a plurality of blades or tubes are provided in a portion in which acoustic waves are induced to free space.

Further, the acoustic wave diffusion unit 17 may be an acoustic wave output body in which an output terminal is formed in a dome form.

In the present invention, a power supply unit 18 including a voltage stabilization circuit that receives commercial power from the outside and that converts and supplies the commercial power to operation power of the acoustic wave generating unit 11, the first and second frequency adjusting units 12 and 13, the acoustic wave output unit 14, the resonance generation acoustic wave output unit 15, and a microprocessor to be described later is further provided.

When light energy is injected into a solar cell formed with a semiconductor, the power supply unit 18 may be a solar power generation unit using a principle in which an electron moves and thus electricity flows and a current occurs.

Hereinafter, operation of the present invention will be described.

According to the present invention, an animal repelling device using acoustic waves includes: an acoustic wave generating unit 11 that generates an electrical pulse signal; first and second frequency adjusting units 12 and that adjust a frequency so as to induce resonance generation of a pulse signal generated in the acoustic wave generating unit 11; an acoustic wave output unit 14 that converts and outputs a pulse signal that is output via the first frequency adjusting unit 12 to acoustic waves; a resonance generation acoustic wave output unit 15 that converts and outputs a pulse signal that is output via the second frequency adjusting unit 13 to acoustic waves; a resonance generation unit 16 that amplifies a sound volume and a frequency by inducing to generate resonance by mutual interference by providing space while acoustic waves that are output from the acoustic wave output unit 14 and acoustic waves that are output from the resonance generation acoustic wave output unit 15 simultaneously stay; and an acoustic wave diffusion unit 17 that diffuses acoustic waves expanded due to resonance generation to free space via an induction path.

The acoustic wave generating unit 11 is a pulse generating circuit including an oscillator that generates a pulse of acoustic waves.

The oscillation circuit is one of a tuning oscillation circuit in which a feedback circuit is made by a transformer of an oscillation circuit, a Colpitts oscillation circuit that extracts a portion of an output from a condenser to return the portion to an input, a Hartley oscillation circuit that extracts a portion of an output from a coil to return the portion to an input, a phase shift parallel R type oscillation circuit that changes a phase of an output voltage of the collector side by 180° and that oscillates by positive feedback of the output voltage to a base of the input side, and a crystal vibrator using a piezoelectric effect (when applying a pressure to crystal such as crystal, Rochelle Salt, tourmaline, and barium titanate, an electric charge occurs at a surface thereof and thus an electromotive force occurs), and other oscillation circuit may be applied.

An oscillation circuit, which is such an acoustic wave generating unit 11 generates a pulse signal.

A pulse signal generated in this way is adjusted to a frequency signal corresponding to acoustic waves in which an animal, which is a repelling target hates through the first frequency adjusting unit 12 formed with an automatic frequency adjustor or a frequency adjustment circuit including an automatic frequency adjustor and is thus injected into the resonance generation unit 16 through a speaker, which is the acoustic wave output unit 14.

Simultaneously, the second frequency adjusting unit 13 adjusts a pulse signal generated in the acoustic wave generating unit 11 to acoustic waves output from the acoustic wave output unit 14 and a frequency signal for resonance, and a pulse signal adjusted in this way is injected into the resonance generation unit 16 through a speaker, which is the resonance generation acoustic wave output unit 15 and a pipe or a pipe.

In this case, in the first frequency adjusting unit 12, a capacitor bank selection circuit operates as an open loop, and by comparing a frequency signal in which a reference frequency is integer divided and the reference frequency signal, the first frequency adjusting unit 12 selects a capacitor bank corresponding to an output frequency, and when a capacitor bank is selected, a capacitor bank adjustment circuit operates as a closed-loop, and by comparing an output voltage corresponding to the output frequency and a preset voltage range, by adjusting a capacitor bank selected from a capacitor bank selection unit, the output voltage is adjusted and output to a desired frequency. This is the same as that of the second frequency adjusting unit 13.

A signal that is output from the first frequency adjusting unit 12 is converted to acoustic waves through the acoustic wave output unit 14 and is output and injected into internal space through an one side terminal of the resonance generation unit 16, and a signal that is output from the second frequency adjusting unit 13 is converted to acoustic waves through the resonance generation acoustic wave output unit 15 and is output and injected into internal space through a side surface of the resonance generation unit 16 adjacent to the acoustic wave output unit 14.

As described above, when acoustic waves are injected through the acoustic wave output unit 14 and the resonance generation acoustic wave output unit 15, the acoustic waves injected through the resonance generation acoustic wave output unit 15 are amplified while vibrating with the same frequency by a frequency of acoustic waves injected from the acoustic wave output unit 14.

The acoustic waves amplified in this way are diffused on free space through the acoustic wave diffusion unit 17, and when the acoustic wave is an ultrasonic wave, the acoustic wave has a form of a longitudinal wave like acoustic waves advancing air or becomes a transverse wave or a distortional wave within a solid. Further, because any one of ultrasonic waves advances (Rayleigh wave) along a solid surface or advances (Lamb wave) along a cross-sectional surface of a thin bar and an object, in the acoustic wave diffusion unit 17 according to an exemplary embodiment of the present invention, a blade or a tube is provided to diffuse acoustic waves.

As described above, according to the present invention, by resonating, amplifying, and diffusing an acoustic wave band in which animals hate, damage of crops by a wild animal, particularly, birds can be prevented, a safety accident at a telegraph pole can be prevented, upon taking off and landing of various airplanes, a safety accident can be prevented, and a safety accident in tracks of high-speed trains can be prevented, particularly, according to the present invention, by amplifying an acoustic wave through resonance by simultaneously staying acoustic waves output from an acoustic wave output unit and acoustic waves output from a resonance generation acoustic wave output unit at space of a resonance generation unit, in an amplifying process, noise or an acoustic wave is deformed and thus an acoustic wave deviated from an acoustic wave in which an animal hates can be prevented from being output.

Hereinafter, another exemplary embodiment of the present invention will be described.

Figure 3:
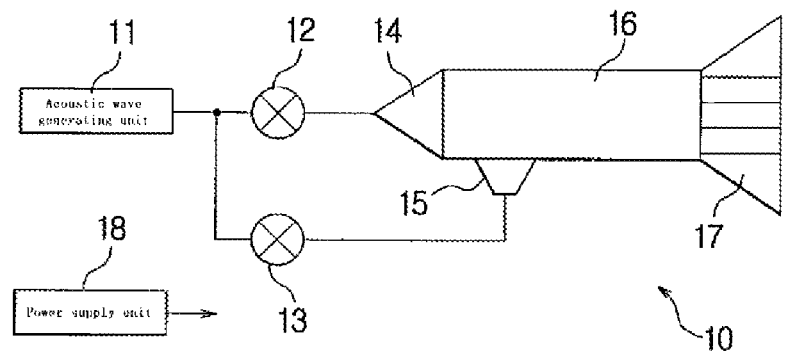
FIG. 3 is a block diagram illustrating a configuration of an animal repelling device according to another exemplary embodiment of the present invention.

As shown in FIG. 3, according to the present invention, the resonance generation acoustic wave output unit 15 may be a speaker directly connected to a side surface of the resonance generation unit 16 adjacent to the acoustic wave output unit 14.

Therefore, by simultaneously transferring acoustic waves to internal space and a surface of a pipe, which is the resonance generation unit 16, resonance may occur.

Figure 4:
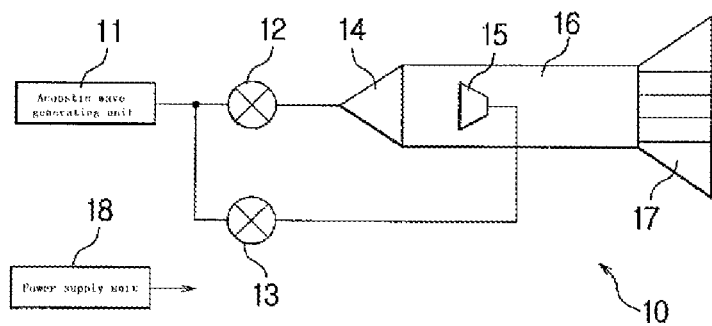
FIG. 4 is a block diagram illustrating a configuration of an animal repelling device according to another exemplary embodiment of the present invention.

Further, as shown in FIG. 4, according to the present invention, the resonance generation acoustic wave output unit 15 may be a speaker provided in internal space of the resonance generation unit 16 so as to position in a facing state in a direction opposite to the acoustic wave output unit 14.

In this way, acoustic waves that are output from the acoustic wave output unit 14 and acoustic waves that are output from the resonance generation acoustic wave output unit 15 cause a mutual reaction, i.e., interference in an opposite state, and thus the acoustic waves are amplified through resonance.

Figure 5:
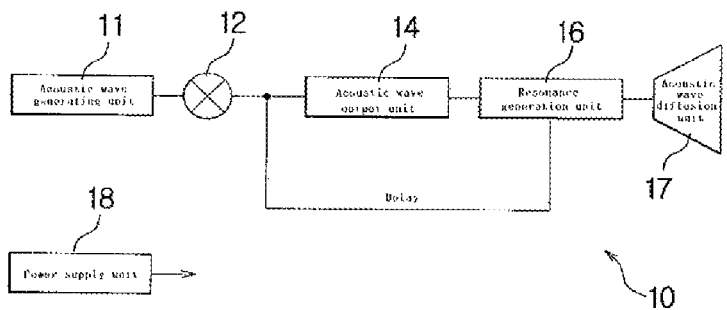
FIG. 5 is a block diagram illustrating a configuration of an animal repelling device according to another exemplary embodiment of the present invention.

Further, as shown in FIG. 5, according to the present invention, space between the first frequency adjusting unit 12 and the acoustic wave output unit 14 and the resonance generation unit 16 may be directly communicated through a pipe without the second frequency adjusting unit 13 and the resonance generation acoustic wave output unit 15.

In this way, an acoustic wave signal that is output from the first frequency adjusting unit 12 is injected (injected with a phase further delayed than that of acoustic waves injected into the acoustic wave output unit 14) through a pipe that communicates space between the first frequency adjusting unit 12 and the acoustic wave output unit 14 and the resonance generation unit 16 while being output to the acoustic wave output unit 14, thereby causing resonance.

The animal repelling device 10 using acoustic waves according to an exemplary embodiment of the present invention may be installed in plural, and each animal repelling device 10 may be disposed so that acoustic waves output from each acoustic wave diffusion unit 17 meet at one point of free space.

Figure 6:
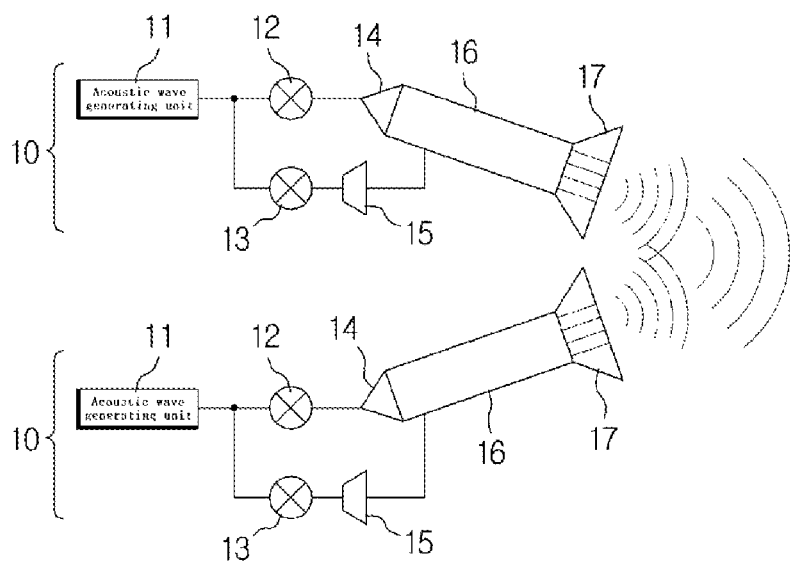
FIG. 6 is a block diagram illustrating a configuration of an animal repelling device according to another exemplary embodiment of the present invention.

That is, as shown in FIG. 6, a pair of animal repelling devices 10 are used, and by adjusting an output direction of each acoustic wave diffusion unit 17, the animal repelling devices 10 may be disposed so that amplified acoustic waves that are output from each acoustic wave diffusion unit 17 meet at one point of free space, and in this case, as amplified acoustic waves are overlapped, a diffusion distance of the amplified acoustic waves may be increased.

FIG. 6 illustrates that two animal repelling devices 10 are used, but in order to enhance a diffusion effect of acoustic waves, three or more animal repelling devices 10 may be coupled. Further, FIG. 6 illustrates a pair of animal repelling devices 10 illustrated in FIGS. 1 and 2, but a plurality of animal repelling devices illustrated in FIG. 3, 4, or 5 may be used according to the spirit of the invention or by mixing the animal repelling devices 10 illustrated in each figure, a plurality of animal repelling devices may be coupled.

While the present invention may be embodied in many different forms, the present invention is to be considered as an exemplification of the principles of the invention and is not intended to limit the invention to the specific embodiments illustrated.

However, those skilled in the art will recognize that many variations of such embodiments exist without departing from the spirit or scope of the invention.

Such variations are intended to be within the scope of the present invention and the appended claims.

The invention claimed is:

1. An animal repelling device using acoustic waves, comprising:
    an acoustic wave generating unit 11 that generates an electrical pulse signal;
    first and second frequency adjusting units 12 and 13 that adjust a frequency so as to induce resonance generation of a pulse signal generated in the acoustic wave generating unit 11;
    an acoustic wave output unit 14 that converts and outputs a pulse signal that is output via the first frequency adjusting unit 12 to acoustic waves;
    a resonance generation acoustic wave output unit 15 that converts and outputs a pulse signal that is output via the second frequency adjusting unit 13 to acoustic waves;
    a resonance generation unit 16 that amplifies a sound volume and a frequency by inducing to generate resonance by mutual interference by providing space while acoustic waves that are output from the acoustic wave output unit 14 and acoustic waves that are output from the resonance generation acoustic wave output unit 15 simultaneously stay; and
    an acoustic wave diffusion unit 17 that diffuses acoustic waves expanded due to resonance generation to free space via an induction path.

2. The animal repelling device of claim 1, wherein the acoustic wave generating unit 11 is a pulse generating circuit comprising an oscillator that generates a pulse of acoustic waves.

3. The animal repelling device of claim 1, wherein the acoustic wave is a vibration or a pressure wave occurring within an elastic medium and is a ultrasonic wave having a specific frequency zone of audible frequencies and a frequency of a value larger than 20 KHz, which is an audible frequency, a high frequency of a range 3-30 MHz, or a super ultrasonic wave of 500 MHz or more.

4. The animal repelling device of claim 1, wherein the first and second frequency adjusting units 12 and 13 are an automatic frequency adjustor or a frequency adjustment circuit comprising an automatic frequency adjustor.

5. The animal repelling device of claim 1, wherein the acoustic wave output unit 14 is a speaker that outputs acoustic waves having an adjusted frequency that is input in the first frequency adjusting unit 12 to internal space through a one side terminal of the resonance generation unit 16.

6. The animal repelling device of claim 1, wherein the resonance generation acoustic wave output unit 15 is a speaker that outputs acoustic waves having an adjusted frequency that is input in the second frequency adjusting unit 13 to internal space through a side surface of the resonance generator 16 adjacent to the acoustic wave output unit 14 and is a pipe that communicates between the speaker and the resonance generator 16 or is a pipe that induces acoustic waves having an adjusted frequency that is input in the second frequency adjusting unit 13 to internal space through a side surface of the resonance generator 16 adjacent to the acoustic wave output unit 14.

7. The animal repelling device of claim 1, wherein the resonance generator 16 is a pipe having resonant space.

8. The animal repelling device of claim 1, wherein the acoustic wave diffusion unit 17 is an expansion type acoustic wave output body that induces acoustic waves amplified by resonance and that diffuses the acoustic wave to free space, and
    a plurality of blades or tubes are provided in a portion in which the acoustic waves are induced to free space.

9. The animal repelling device of claim 8, wherein a plurality of animal repelling device using the acoustic wave exist, and each animal repelling device is disposed so that acoustic waves that are output from each acoustic wave diffusion unit 17 meets at one point of free space.

10. The animal repelling device of claim 1, wherein a plurality of animal repelling device using the acoustic wave exist, and each animal repelling device is disposed so that acoustic waves that are output from each acoustic wave diffusion unit 17 meets at one point of free space.

11. The animal repelling device of claim 2, wherein a plurality of animal repelling device using the acoustic wave exist, and each animal repelling device is disposed so that acoustic waves that are output from each acoustic wave diffusion unit 17 meets at one point of free space.

12. The animal repelling device of claim 3, wherein a plurality of animal repelling device using the acoustic wave exist, and each animal repelling device is disposed so that acoustic waves that are output from each acoustic wave diffusion unit 17 meets at one point of free space.

13. The animal repelling device of claim 4, wherein a plurality of animal repelling device using the acoustic wave exist, and each animal repelling device is disposed so that acoustic waves that are output from each acoustic wave diffusion unit 17 meets at one point of free space.

14. The animal repelling device of claim 5, wherein a plurality of animal repelling device using the acoustic wave exist, and each animal repelling device is disposed so that acoustic waves that are output from each acoustic wave diffusion unit 17 meets at one point of free space.

15. The animal repelling device of claim 6, wherein a plurality of animal repelling device using the acoustic wave exist, and each animal repelling device is disposed so that acoustic waves that are output from each acoustic wave diffusion unit 17 meets at one point of free space.

16. The animal repelling device of claim 7, wherein a plurality of animal repelling device using the acoustic wave exist, and each animal repelling device is disposed so that acoustic waves that are output from each acoustic wave diffusion unit 17 meets at one point of free space.

* * * * *